Sept. 4, 1951 J. R. BOYLE 2,566,307
DEW POINT MEASURING APPARATUS AND METHOD
Filed Sept. 30, 1943 5 Sheets-Sheet 1
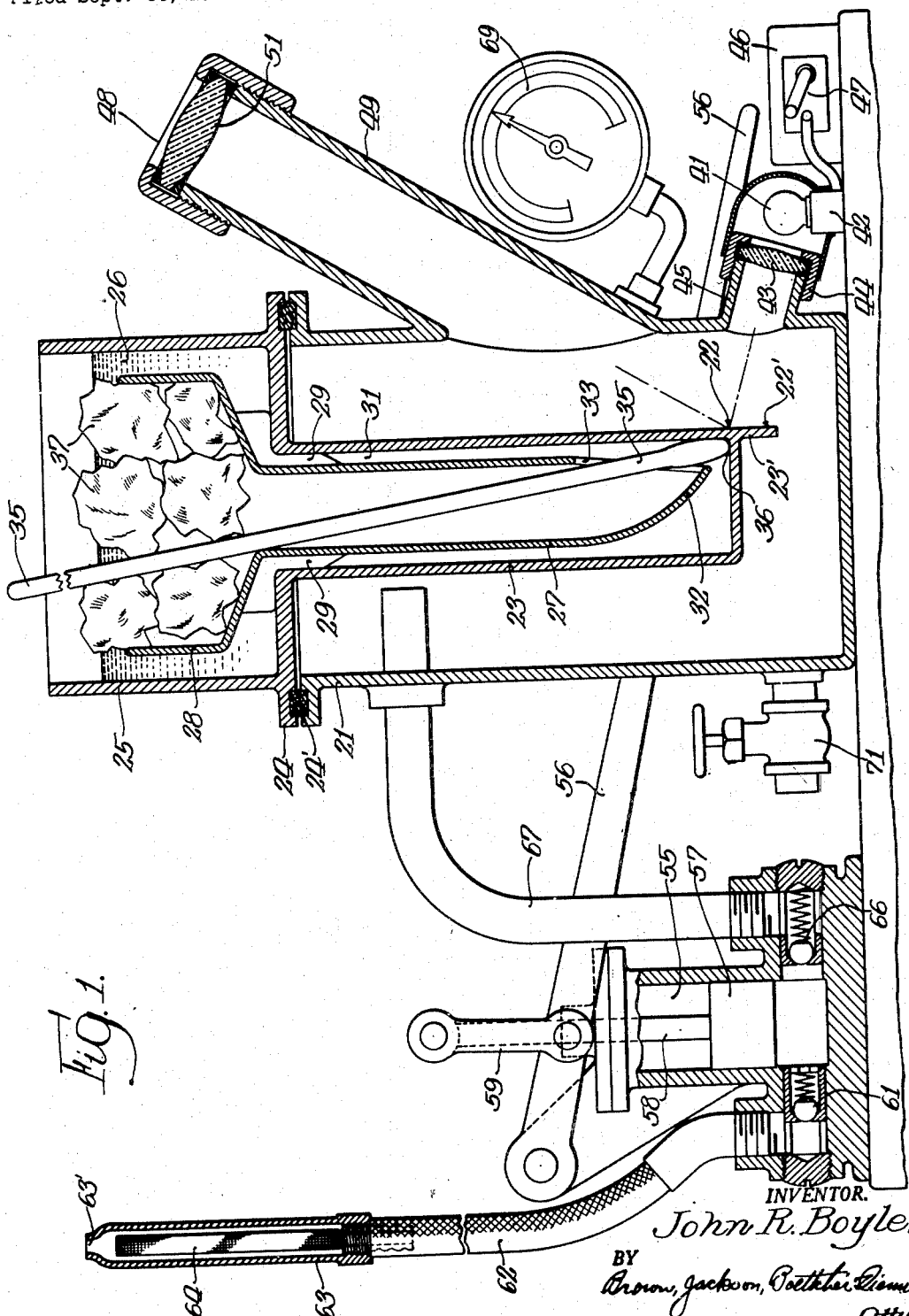
INVENTOR.
John R. Boyle.
BY
Brown, Jackson, Boettcher & Dienner
Attys

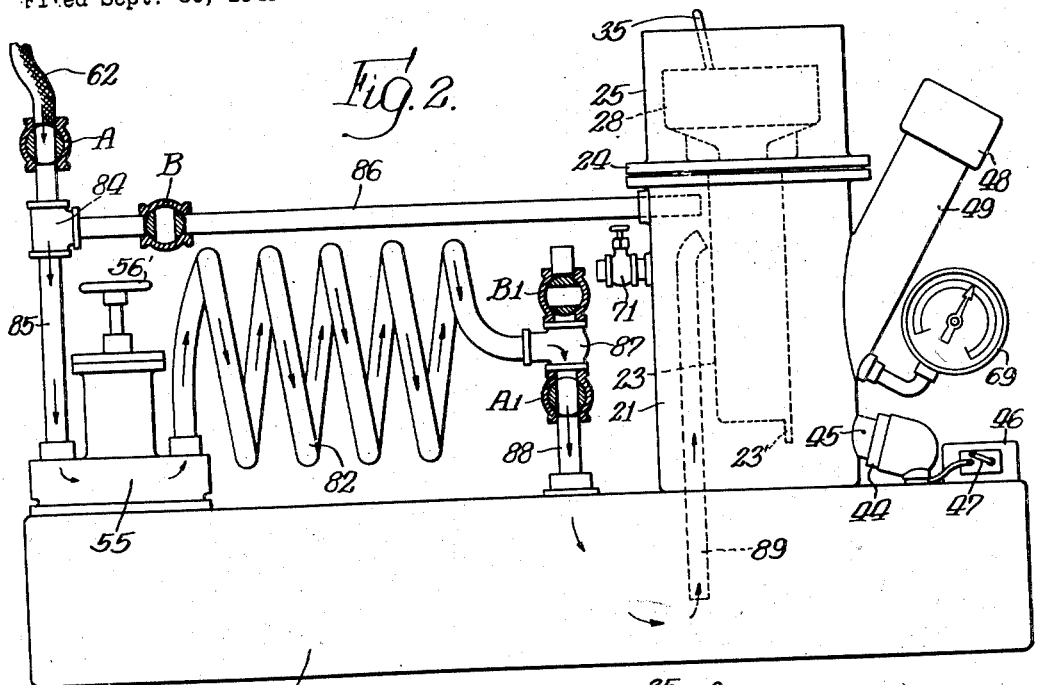
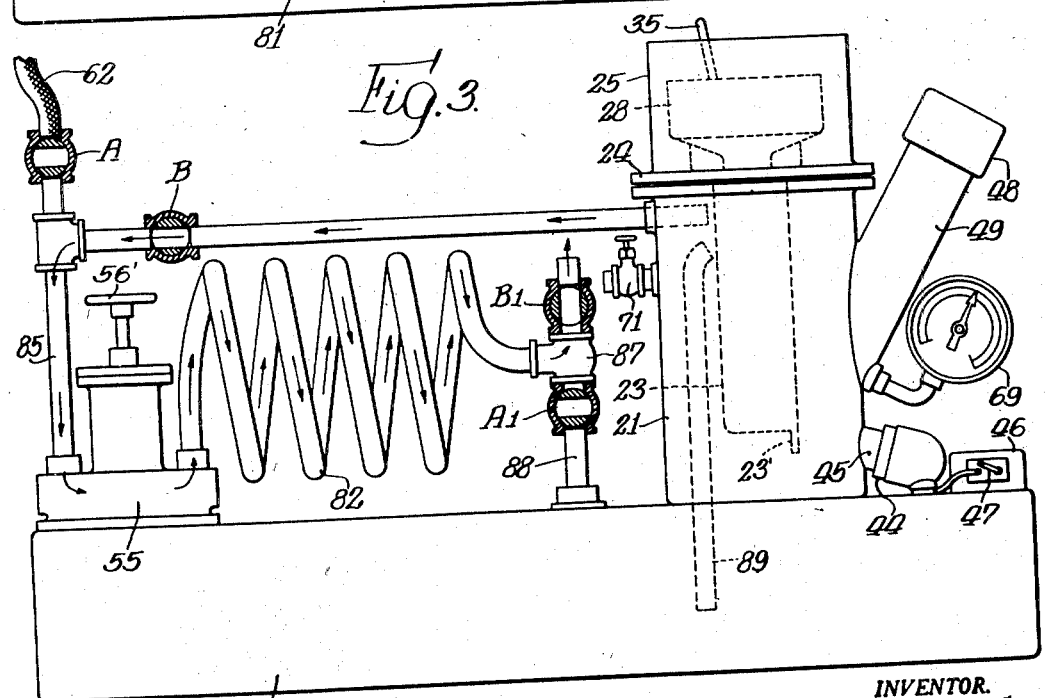

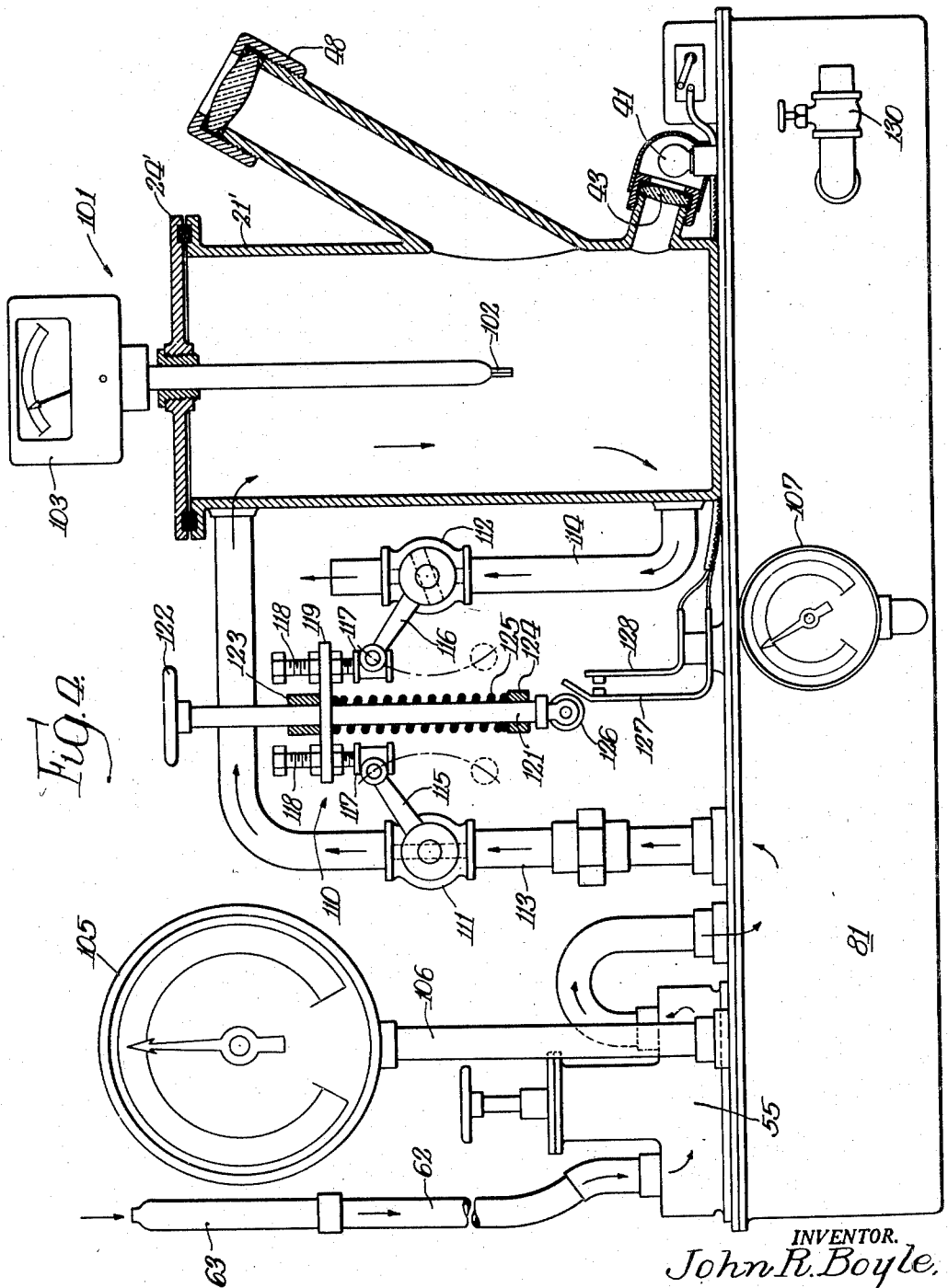

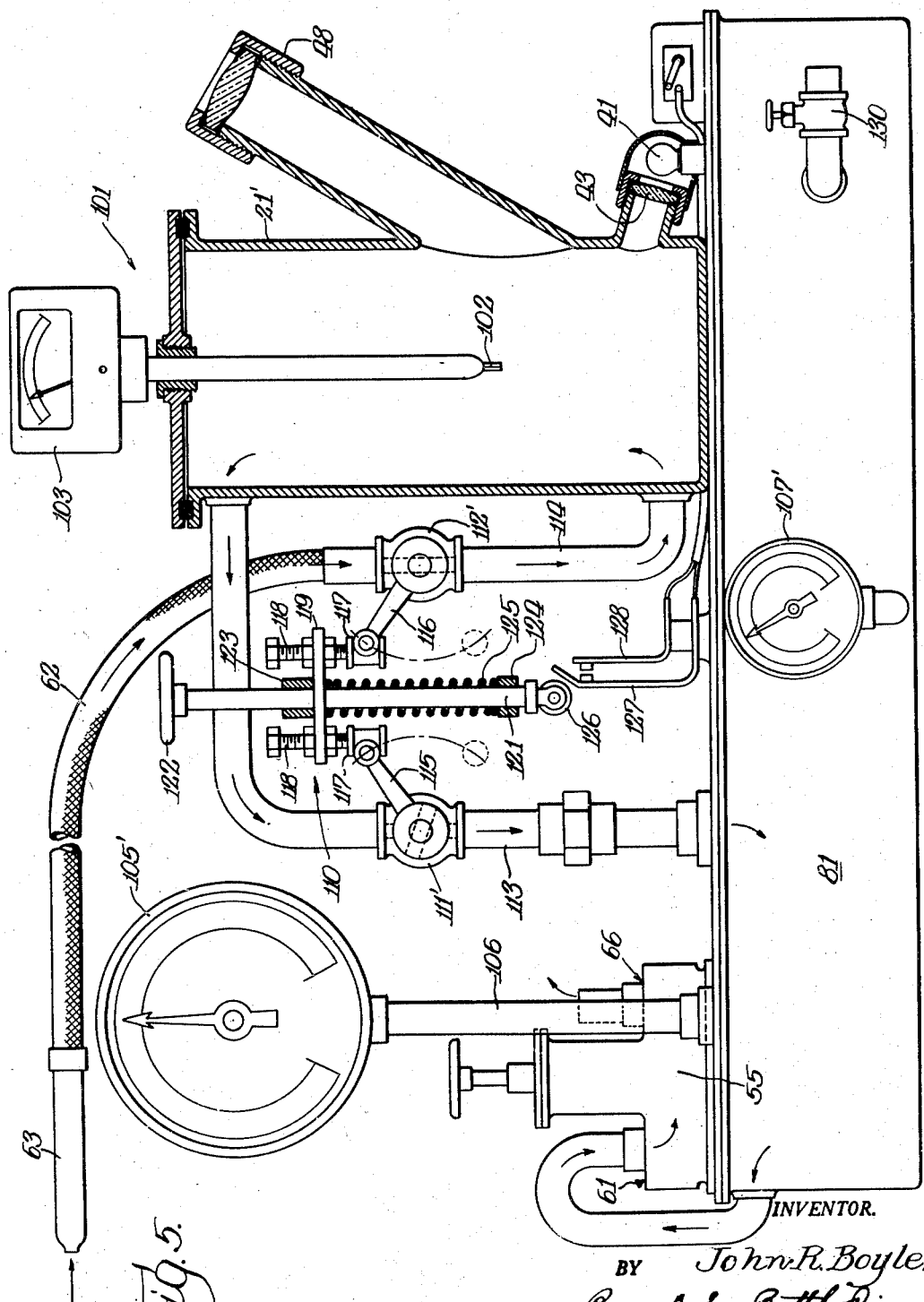

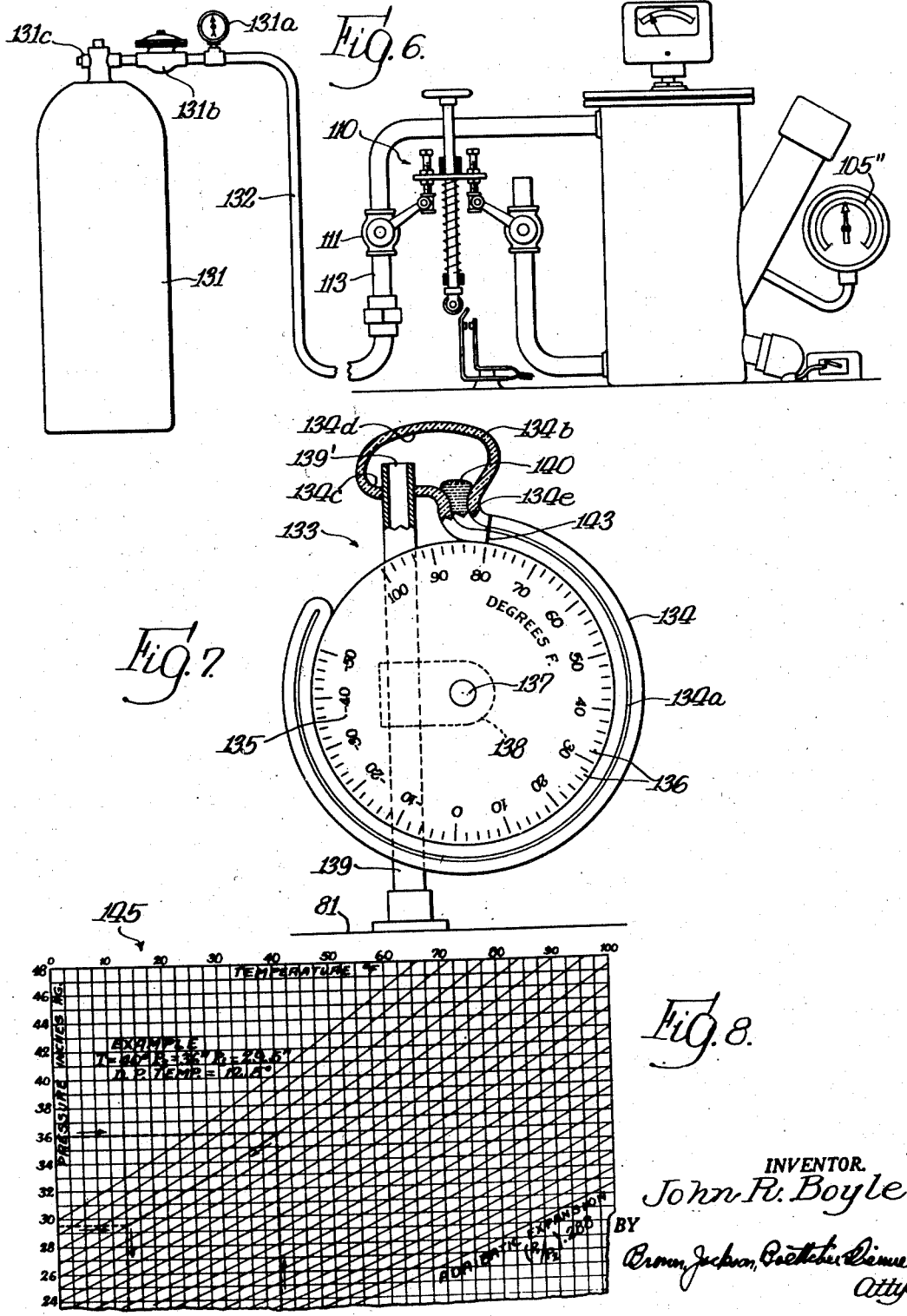

Patented Sept. 4, 1951

2,566,307

UNITED STATES PATENT OFFICE 2,566,307

DEW POINT MEASURING APPARATUS AND METHOD

John R. Boyle, Chicago, Ill., assignor to Illinois Testing Laboratories, Inc., Chicago, Ill., a corporation of Illinois Application September 30, 1943, Serial No. 504,348

21 Claims. (Cl. 73—17)

1

The present invention relates to an improved method of and apparatus for determining the humidity or dew point of a gas. Such gas may be substantially any gas containing a sensible amount of vapor or humidity, such as atmospheric air, conditioned air produced by air conditioning apparatus, industrial gases used in industrial operations, and numerous other gases of like nature.

One of the objects of the invention is to provide an improved method and apparatus which will function through a much greater range of operating conditions than has been true of prior apparatus, such as a greater range of temperature, a greater range of moisture content, a greater range of pressure in the gas being tested or operated upon, etc.

Another object of the invention is to provide an improved method and apparatus which will enable the testing operation to be performed with greater facility, ease and certainty than has been possible with the prior apparatus heretofore known to me. Thus the use of my improved apparatus does not demand a high degree of skill on the part of the operator.

Another object of the invention is to provide an improved method and apparatus which will have a greater degree of accuracy than has been obtainable with prior methods and apparatus.

Another object of the invention is to provide an improved method and apparatus in which a pressure change is produced in the gas sample as one of the fundamental steps of the operation, this pressure change bringing the gas to a temperature equivalent to the saturation point of its contained vapor or the point at which condensation occurs. This step of producing a pressure change in the sample to the end of condensing a small portion of the vapor to a condensate which can be readily sensed by visual observation or otherwise, is a distinctive feature which enables many of the foregoing advantages to be obtained.

Other objects, features and advantages of the invention will appear from the following description of certain preferred embodiments thereof. In the accompanying drawings illustrating such embodiments:

Figure 1 is a diagrammatic side view of one embodiment of my invention, showing the condensing chamber in cross-section;

Figure 2 is a diagrammatic side view of another embodiment of my invention adapted to both pressure and suction operation of the condensing chamber, this view showing the valve apparatus arranged for pressure operation;

Figure 3 is a view similar to Figure 2 showing the valve apparatus arranged for suction operation of this same embodiment;

Figure 4 is a diagrammatic side view of another embodiment in which the condensation occurs in the form of a freely suspended fog as distinguished from the preceding embodiments in which the condensation occurs on a cooled surface, this figure showing the fog chamber in cross-section;

Figure 5 is a view similar to Figure 4 showing this general embodiment of the invention arranged for suction operation rather than pressure operation;

Figure 6 is a diagrammatic view showing the manner in which I employ my apparatus to measure the dew point of a gas stored in a high-pressure drum or the like;

Figure 7 is a diagrammatic view, partly in section, showing a direct reading gauge for giving the dew point measurements in direct reading indications; and Figure 8 is a fragmentary view of a chart which can be used in conjunction with certain embodiments of my invention to facilitate computation of the dew-point.

Referring first to the embodiment illustrated in Figure 1, this construction comprises a condensing chamber 21 in which condensation of the moisture content is made to occur on a cooled condensing surface 22. This cooling surface is defined at the lower end of a cooling tube 23 which is carried by a head 24 closing the upper end of the chamber 21. A gasket 24' composed of fiber or like heat insulating material tends to thermally insulate the tube from the chamber. Extending upwardly from the tube 23 and head 24 is a liquid receptacle 25 adapted to contain the cooling liquid 26. Extending down centrally within the cooling tube 23 is a circulating tube 27 formed with an enlarged cup 28 at its upper end. A plurality of radially extending fins 29 projecting outwardly from the circulating tube 27 maintain the circulating tube 27 and cup 28 spaced from the cooling tube 23 and liquid storage receptacle 25 whereby a circulating flow of liquid can occur downwardly through the inner tube 27 and thence upwardly through the space 31 between the two tubes and into the liquid receptacle 25. The lower end of the inner circulating tube 27 is preferably deflected laterally, as indicated at 32, and this tube is formed with a lateral opening 33. This arrangement permits a thermometer 35 to be placed in the circulating tube in such position that the lower end of the thermometer normally reposes in the lower right hand corner of the cooling tube 23, in direct contact with the inner side of the tube wall at a point in closest proximity to the outer cooling surface 22. Thus, the thermometer 35 always affords an accurate measurement of the temperature of the cooling surface 22. In measuring the humidity or dew point of atmospheric air under most conditions the condensing surface 22 is maintained at the water temperature prevailing below floating ice, i. e. at maximum water density, which is substantially 39° F. Under these operating conditions, water is the liquid medium 26 and lumps of ice 37 are placed in the cup 28 for maintaining the water at or near the temperature of melting ice. It will be noted that a thermo-syphon circulation occurs constantly from the melting ice down through the inner circulating tube 27 and through the opening 33 into direct contact with the wall of the cooling tube 23 at the lower right hand corner 36 of said latter tube, the water thence flowing upwardly through the space 31 back into the liquid receptacle 25 and over the top of the cup 28 for again contacting the ice 37.

An electric light bulb 41 or other suitable source of light is arranged to project light rays against the cooling surface 22. In the illustrated embodiment, this light bulb is carried in any suitable mounting socket 42 and the light rays are concentrated or focused on the condensing surface 22 by a lens 43 carried by a mounting ring 44, this mounting ring having mounting on a boss portion 45 projecting from the condensing chamber 21. The bulb 41 is energized from a battery 46 or any other suitable source of electrical energy, through a suitable control switch 47.

The reflection of the light rays from the condensing surface 22 is viewed through an optical eye piece 48 which is mounted in an inclined tubular boss 49 extending from the chamber 21. The eye piece 48 comprises one or more lenses 51 of appropriate focal length and magnification for enabling condensate or dew on the surface 22 to be readily discerned. If desired, the eye piece 48 may be arranged for inward and outward focal adjustment in the tubular extension 49.

The air or gas which is to have its dew point measured is forced into the condensing chamber 21 by a suitable pump 55. This pump may be of any desired construction capable of creating pressures as high as 100 or 150 pounds per square inch in the condensing chamber 21. The pump is preferably actuated by an operating lever 56 having any suitable operating connection with the pump piston 57 capable of creating the above pressures. In the exemplary arrangement illustrated in Figure 1 the piston rod 58 has its upper end pivotally connected with a forked inner portion of the operating lever 56 through the medium of a cross yoke and depending links 59. The inlet valve 61 of the pump has communication through a flexible inlet duct 62 with an inlet fitting 63. This inlet fitting preferably includes a fine straining screen 64 through which all inlet air or gas must pass so as to minimize the likelihood of dust, dirt and other foreign matter getting into the pump or into the condensing chamber. All of the air or gas enters through the outer port 63' of the fitting. The inlet fitting 63 can be placed in any desired position, either for drawing atmospheric air when the atmospheric dew point is to be determined, or for introduction into ducts, chambers or other exploring uses. If it is desired to determine the dew point of a contained charge of gas, the inlet end of the flexible tube 62 may be coupled directly to the container in which the charge of gas is confined. The outlet valve 66 of the pump connects through pipe 67 with the interior of the condensing chamber 21, this point of connection being preferably remote from the cooling surface 22 so as not to adversely affect the desired temperature to be maintained at this cooling surface. In the illustrated arrangement the pipe 67 opens into the upper portion of the condensing chamber 21 for impingement against the cooling tube 23 at a point opposite to the cooling surface 22, this arrangement tending to remove the heat of compression from the entering air or gas and also resulting in an increased thermo-syphon circulation upwardly through the cooling tube 23. A pressure gauge 69 is connected with the interior of the condensing chamber 21 to give an accurate indication or measure of the pressure prevailing therein, this preferably being a Bourdon tube gauge, although other types of gauges may be employed. A discharge valve 71 is provided for discharging the condensing chamber 21 to atmosphere after a measurement has been completed.

Referring now to the operation of this first embodiment of the invention we will assume that it is desired to determine the dew point of the atmosphere or of a particular gas where such atmosphere or gas is at a temperature below 39° F.

The temperature of 39° F. is arbitrarily chosen because that is substantially the water temperature prevailing below melting ice and hence when the sample of air or gas to be measured has a temperature below 39° F. I am enabled to use melting ice for establishing the temperature of the condensing surface 22. The liquid chamber 25 and cup 28 are filled with water and ice approximately to the levels indicated and the unit allowed to stand for a sufficient interval to insure that the condensing surface 22 has reached the temperature of approximately 39° F. This can be checked or watched through the thermometer 35. Thereupon the pump 55 is operated to force the air or selected gas into the condensing chamber 21. During the first part of this pumping interval it may be desirable to leave the discharge valve 71 open so as to discharge from the chamber the residual air or gas remaining therein from the preceding measuring operation. After such venting of the old air or gas has been completed the valve 71 is closed and the light 41 illuminated, and the operator then begins a continuous observation of the condensing surface 22 through the eye-piece 48. It will be evident that as the pump 55 continues to force more air or gas into the condensing chamber, with consequent increase of pressure therein, it also increases the density of the moisture or vapor particles in the chamber. When the density of the vapor reaches the saturation point of air at 39° F. then condensation immediately forms on the condensing surface 22 because this surface has a sustained temperature of 39° F. More specifically, this condensation will occur when the density of the vapor in proximity to the surface 22 has reached the approximate value of .0003943 pound per cubic foot or equivalent to 2.760 grains per cubic foot as obtained from the standard saturated steam tables, where the vapor pressure corresponding to 39° F. is 0.1171 pound per square inch, this being the saturation point or dew point of air at 39° F. Once the saturation point or dew point is reached the condensation forms quickly on the surface 22 and is immediately visible through the eye-piece 48. Prior to the condensing of the vapor on the surface 22 only a relatively small amount of light is reflected up to the eye-piece 48. The collection of condensate on this surface 22 immediately improves the reflecting characteristic of the surface by reason of the multitudinous tiny globular or spherical surfaces which these moisture particles present to the light rays coming from the light 41. These minute globular surfaces reflect a greatly increased amount of light up to the eye-piece 48 as soon as condensation occurs. The angle of incidence of the rays from the light bulb and the angle of reflection up to the eye-piece 48 are preferably arranged to augment as much as possible the contrast between the absence of condensation and the presence of condensation on the surface 22. Another source of contrast can be provided for by extending a flange 23' down from the lower end of the tube 23 to provide a lower contrasting surface 22' immediately below the condensing surface 22. The contrasting surface 22' does not receive as much cooling effect from the circulating ice water as does the condensing surface 22, and hence contrast of appearance between the two surfaces also helps to establish the fact that condensation has occurred on the surface 22. As soon as this condensation occurs the operator ceases actuating the pump 55 and immediately notes the pressure which is indicated by the pressure gauge 69. This pressure in its relation to atmospheric pressure or to absolute pressure is a function of the dew point of the sample of air or gas contained within the condensing chamber 21. The dew point may be obtained from a direct reading calibration of the pressure gauge 69, or it may be obtained by reference to a chart or table. Where the instrument is intended always to operate under the same conditions, as for example when the condensing surface 22 is always cooled to the temperature of water below melting ice, then the pressure gauge 69 can be directly calibrated in terms of the dew point of the air or gas in the condensing chamber. However, if other mediums are to be employed to maintain a predetermined temperature at the condensing surface 22 then it may be preferable to take the pressure readings of the pressure gauge 69 and arrive at the dew point by mathematical computation or by reference to charts or tables. To illustrate the method of arriving at the dew point by mathematical computation let us assume that at the instant of condensation the pressure reading of the gauge 69 was 147 pounds, i. e. 10 times that of the average sea level barometric pressure of 14.7 pounds. Hence, the density of the vapor in the sample being pumped into the condensing chamber was only one tenth of the vapor density of saturated air at 39° F. Since the vapor density of saturated air at 39° F. is 2.760 grains per cubic foot, then the density of the sample being pumped into the condensing chamber was 1/10 of this value of approximately .276 grain per cubic foot. Referring now to standard tables of saturated water vapor, it will be seen that .276 grain per cubic foot represents the weight of saturated vapor in air of −10° F. Hence, the air or gas in the condensing chamber has a dew point of −10° F.

When using melting ice as the cooling medium for cooling the condensing surface 22, it is also possible to measure the dew point of gases having higher dry bulb temperatures than 39° F., provided that the humidity of such gases is below the saturation point of 39° F. air, i. e., below 2.760 grains per cubic foot. For example, it is possible to measure the dew point of air having a 70° F. dry bulb temperature when said air has a relative humidity of less than substantially 34%, viz., less than 2.760 grains of vapor per cubic foot.

When measuring air or gas having an extremely low dew point it may be desirable to employ lower temperature cooling mediums than melting ice for cooling the condensing surface 22. For example, when measuring a gas having a moisture content less than 3 or 4 grains of vapor per pound of dry air, it is necessary to create pressures in the condensing chamber 21 ranging upwards of 150 pounds per square inch, and these pressures may be objectionable. Accordingly, I may substitute Dry Ice or Freon or a like medium in place of melting ice in the cooling tube 23. An appropriate thermometer 35 is preferably employed in conjunction with either of these other cooling mediums for giving an accurate indication of the temperature of the cooling surface. When using any one of these other cooling mediums the operation is substantially the same as described above. Having a known temperature at the condensing surface 22 and a known pressure of the air or gas at the instant of condensation, it is possible to determine the dew point of such air or gas by a mathematical computation or by reference to appropriate tables or charts, as above described.

When measuring the humidity of a vapor containing gas or air having a higher humidity than 2.760 grains per cubic foot, I contemplate substituting higher temperature cooling mediums in place of the melting ice. For example, carbon tetrachloride, because of its relatively high rate of evaporation, will maintain the cooling surface 22 at approximately 65° F. Furthermore, it is also possible to maintain a circulatory flow of water of known temperature down through the circulating tube 27 and up through the cooling tube 23, or to maintain a fixed quantity of water in these tubes, in either situation utilizing a thermometer 35 to keep a close check on any variations of temperature of the condensing surface 22. If the pressure gauge 69 is calibrated for the 2.760 grains corresponding to 39° F. dew point air, then the use of water at substantially 58½° F. will result in all gauge readings being raised by a scale multiplier of "2" (viz., 2.76×2=5.52, such being the grains of vapor per cubic foot at the saturation point of 58½° F. air). Similarly, for a scale multiplier of "3" we can use water of approximately 71° F. (viz., 2.76×3=7.28, such being the grains of vapor at the saturation point of 71° F. air). In the same manner, the use of water of 70° F. temperature would result in the use of a scale multiplier of "2.92."

Referring now to the embodiment illustrated in Figures 2 and 3, this construction employs a condensing chamber 21 substantially the same as that above described, but provision is made in this modified construction for operating such condensing chamber either under compression or under evacuation. Inasmuch as the condensing chamber is substantially the same as that above described there is no need of repeating the description, the same reference numerals being shown as applied to the same parts. This modified construction comprises additional elements consisting of a reservoir 81, a heat dissipating or temperature equalizing coil 82, and a system of piping and valves which enables the same unit to be employed alternatively for pressure operation or for vacuum operation. The reservoir 81 is shown as functioning as a supporting base on which the condensing chamber 21 and pump 55 are mounted, although this is not essential. The flexible inlet duct 62 leading from the inlet fitting 63 has connection through valve A with T connector 84. Leading from one branch of this T connector is a pipe or duct 85 extending to the inlet valve 61 of the pump 55. The other branch of the T connector 84 has connection through pipe or duct 86 with the upper portion of the condensing chamber 21. A valve B is interposed in the pipe 86. Leading from the outlet valve 66 of the pump 55 is the coil 82 which is adapted to dissipate heat or equalize the temperature of the sample of air or gas being measured, as will be hereinafter described. The other end of the coil 82 opens into a T connection 87 which has its two branches connected respectively with valves A1 and B1. The valve A1 has connection through pipe 88 with the interior of the reservoir 81. The valve B1 opens directly to atmosphere. A conduit or passageway 89 leads from the interior of the reservoir 81 into the interior of the condensing chamber 21. The four valves A, A1, and B, B1 may be any desired form of shut-off valves, being preferably quick opening and quick closing cocks, however. The valves A and A1 are adapted to be operated conjointly, and may therefore be linked together mechanically if desired; and, similarly, the valves B and B1 are adapted to be operated conjointly and may also be mechanically linked together.

When the apparatus is to be operated by the pressure methods described above in connection with the preceding embodiments, the valves A and A1 are both moved to their open positions and the valves B and B1 are both moved to their closed positions, as diagrammatically illustrated in Figure 2. When the pump 55 is now actuated, the sample of air or gas is drawn in through the flexible inlet duct 62 and valve A to the inlet side of the pump 55. From the outlet side this air or gas is thence forced through the coil 82 and through valve A1 down into the reservoir 81. Passing the air or gas through the coil 82 serves to dissipate the heat of compression or to effect a substantial equalization between the temperature of the air or gas being measured and atmospheric temperature. The reservoir 81 is preferably composed of metal, and has a large heat radiating surface. Hence, this reservoir also serves to dissipate heat or equalize the temperatures. From the reservoir 81 the compressed air or gas passes upwardly through conduit 89 into the condensing chamber 21. The outlet valve 71 may be opened during the initial operation of the pump 55 for scavenging old gas from the condensing chamber 21 and the reservoir 81 at the start of a new operation. Upon closing this valve 71 the pressure begins to build up in the condensing chamber 21 in the same manner as described above in connection with Figure 1. Thereupon the apparatus is operated by the pressure method in the same manner as described above, using any one of the aforementioned mediums for cooling or establishing a desired temperature at the condensing surface 22. As mentioned above, the provision of the coil 82 serves to dissipate the heat of compression in this pressure method of operation of the unit. The provision of the reservoir 81 also aids in dissipating the heat of compression, and it further tends to equalize or render more uniform the constituency of the sample of gas being measured.

Referring now to Figure 3, this same apparatus can also be converted to the vacuum or suction method of operation by merely closing the valves A, A1 and opening the valves B, B1. It will now be seen that when the pump 55 is actuated the suction side of the pump is connected through valve B with the interior of the condensing chamber 21, thereby tending to evacuate the condensing chamber. The outlet side of the pump 55 is merely discharged to atmosphere through coil 82 and valve B1. This evacuation or pressure reduction method is particularly intended for situations where the sample of gas being measured has a dew point which is above the temperature of the condensing surface 22. This sample of air or gas is admitted to the condensing chamber 21 through the valve 71, which may be connected with a conduit or exploring tube if controlled or selective sampling is desired. Assuming that the sample has a dew point which is above the temperature of the condensing surface 22, it will be apparent that condensate or dew will show on the surface 22 as soon as the sample enters the chamber 21. If the sample is at atmospheric pressure, such inflow is induced by operating the pump 55. Thereupon the valve 71 is closed and the pump continued in operation until the pressure in the chamber 21 has been brought down to the point where the dew disappears from the surface 22. Following this the pressure in the chamber is slowly increased by a gradual opening of the valve 71 until the dew reappears. This pressure $P_s$ is saturation of the vapor at temperature $t$, the same as before.

This pressure at which the dew disappears and reappears is the saturation of the vapor at the temperature of the condensing surface 22, the same as before. Let us assume an example where ice water is being used to maintain the condensing surface 22 at a temperature of approximately 39° F. (having the aforementioned vapor saturation of 2.76 grains per cubic foot) and that the prevailing barometric pressure is 29.92 inches of mercury. It will also be assumed that the sample to be tested has a temperature of 80° F., and that it is necessary to evacuate the condensing chamber down to 20 inches of mercury absolute pressure before reaching the critical point where condensation disappears and reappears on the surface 22. The grains of vapor per cubic foot in this sample are then derived mathematically as follows:

$$\frac{29.92}{20} \times 2.76 = 4.13$$

grains per cubic foot. Referring now to standard steam tables, this vapor density represents saturation at 50.2° F., and hence it will be seen that the sample has a dew point of 50.2° F.

By reason of being able to operate under either pressure or suction, the embodiment of Figures 2 and 3 can perform measuring operations over a wide range of temperatures. For example, the apparatus can be readily constructed to withstand 150 pounds per square inch for pressure operation, and the pump 55 can be readily constructed to draw a suction down to 5 inches of mercury absolute pressure for suction operation. Assuming that the condensing surface 22 is maintained substantially at the 39° F. temperature referred to above, the 150 pound maximum pressure will enable dew point measurements to be carried down to a lower limit of approximately −11° F. dew point. This is arrived at as follows:

$$\frac{15 \text{ (approximate atmospheric pressure)}}{150 \text{ (maximum pressure)}} \times 2.76 = .276$$

grain per cubic foot. This is the weight of saturated vapor at approximately —11° F., such being therefore the lower limit of operation at 150 pounds pressure and a 39° F. constant temperature at the condensing surface. The upper limit under a depression of 5 inches of mercury is approximately a dew point of 93° F. This is arrived at as follows:

$$\frac{29.92 \text{ (barometric pressure)}}{5 \text{ (maximum suction)}} \times 2.76 = 16.5$$

grains per cubic foot. This is the weight of saturated vapor at approximately 93° F., such being therefore the upper limit of operation at a suction of 5 inches of mercury and a constant temperature of 39° F. at the condensing surface 22.

For performing dew point measuring operations above 93° F. or below —11° F. other fluids may be used for predetermining the temperature of the condensing surface 22, such as a volatile fluid with fixed atmospheric boiling point, or warm water with a constant checking of the temperature indicated by thermometer 35.

When using a medium like melting ice to predetermine the temperature of the condensing surface (at substantially 39° F.), there are enough constants that a pressure ratio gauge scale can be arranged to read directly in grains per cubic foot. Also, a simple secondary gauge scale can be arranged to read directly in terms of dew point. Where other constant temperatures, in addition to 39° F., are to be employed, additional gauge scales may be added for these additional temperatures. For greater accuracy of gauge indication, it may be desirable to employ two gauges, one for pressure and one for vacuum; or one for high pressure and vacuum and one for low pressure and vacuum, the latter being closed off during high pressure operation. I also contemplate employing a thermocouple placed against the condensing surface 22 for greater accuracy of temperature measurements. It will be understood that the surfaces 22 and 22' are preferably highly polished to accentuate the appearance of the dew thereon. In Figures 2 and 3 the valve 71 and the upper end of the conduit 89 are positioned near the upper end of the cooling tube 23 so that whenever air enters the condensing chamber 21 through said valve or conduit the tube will exert a cooling influence on the air and the thermosyphon flow through the tube will also be augmented. In some instances the outer and inner tubes 23 and 27 may be made considerably shorter than shown to obtain the desired temperature at the surface 22. The pump 55 may be actuated by the lever 56 or by a knob 56' secured to the upper end of the piston rod 58. The embodiments disclosed in Figures 1, 2 and 3 have been made the subject matter of my copending application, Serial No. 234,820, filed July 2, 1951.

Referring now to the embodiment illustrated in Figure 4, this construction is quite similar to those above described except that the condensations occurs in the form of a fog suspended in the condensing chamber, and this fog is produced by effecting a pressure drop in the condensing chamber, with resulting adiabatic cooling of the air or gas in the chamber. The apparatus comprises a condensing chamber or fog chamber 21' which may be quite similar to the condensing chamber 21 of the preceding embodiments, having a source of light 41 for projecting a concentrated beam of light into the chamber through lens 43, and having an optical system or eye piece 48 for viewing the reflection or refraction of the light rays from or by the fog particles as soon the the fog is formed. The tubes 23 and 27 are omitted from this embodiment since all sensing of the dew point is effected through the medium of the freely suspended fog rather than through the precipitation of dew upon a surface. The top of the chamber 21' is closed by a head 24' which preferably carries a pyrometer 101 comprising a depending stem portion carrying the thermally responsive element in the form of a thermocouple 102, arranged to actuate a direct reading meter 103. The latter is preferably of the galvanometer type arranged for quick response (no damping) so that the correct dew point can be read directly from the instrument before the fog chamber temperature has been dissipated. The system also comprises the pump 55 and reservoir 81, the several units being shown as mounted on the reservoir, although this, of course, is optional. If desired, a cooling coil 82 may be connected between the pump outlet 66 and the reservoir, as in Figures 2 and 3, although in this later embodiment I find that ample heat radiation or temperature equalization occurs through the metallic walls of the reservoir. If desired, fins may be provided on the reservoir to augment the heat interchange. The reservoir preferably has a capacity approximately ten to fifteen times that of the fog chamber 21'. The air or gas whose dew point is to be measured is drawn in through the inlet fitting 63 and duct 62 and is forced by pump 55 into the reservoir 81. In this embodiment the pressures are relatively low, probably not exceeding 40 or 50 inches of mercury absolute pressure, and hence a rubber bulb can be used for creating the pressures instead of the pump 55, if desired. The pressure gauge 105 connected to the interior of the reservoir through pipe 106 gives a constant indication of the pressure in the reservoir. The temperature of the air or gas in the reservoir is also continuously indicated by a suitable thermometer 107 having a thermal element in the reservoir.

In the operation of this embodiment, small charges or samples of the stored up accumulation of gas in the reservoir are admitted in successive operations to the fog chamber 21' where they are successively "blown down" to atmospheric pressure for producing an adiabatic cooling of the gas and its contained vapor. Such cooling tends to create a fog in the fog chamber, and the dew point is determined by noting the lowest pressure which is effective to produce the fog in these successive "blowing down" operations. Such "blowing down" operations are effected through the timed operation of manually actuated valve mechanism 110 which normally places the fog chamber in communication with the reservoir, and which then closes this communication and vents the fog chamber to atmosphere in the performance of the "blowing down" operation. Such valve mechanism may be of various forms but in the exemplary arrangement illustrated it comprises a rotary inlet valve 111 and a rotary outlet valve 112, the inlet valve controlling the inflow of gas from the reservoir through conduit 113 into the fog chamber, and the outlet valve controlling the outflow of gas from the fog chamber through conduit 114 to atmosphere. Arms 115 and 116 extending from these valves have bifurcated ends which engage in collars 117 which are carried by adjusting screws 118 mounted in a cross yoke 119. This yoke is secured to a reciprocable plunger 121 having an actuating head 122 at its upper end and guided by upper and lower spaced guides 123 and 124. A compression spring 125 confined between the yoke 119 and the lower guide 124 tends to hold the plunger in the upper position illustrated. A roller or cam 126 at the lower end of the plunger is arranged to actuate contact spring 127 into engagement with contact spring 128 as soon as the plunger starts its downward movement, these two contact springs thereupon closing the circuit of the light 41 to illuminate the latter.

Referring now to the operation of this embodiment, the reservoir 81 and fog chamber 21' are preferably first thoroughly scavenged of all residual air or gas remaining from preceding operations by pumping one or more accumulations of the newly selected air or gas into the reservoir and performing several blowing down operations through the fog chamber, and also venting the reservoir through the outlet valve 130. Thereafter, an accumulation of the selected air or gas is then pumped into the reservoir 81 to a pressure of approximately 40 or 50 inches of mercury, as indicated by the gauge 105. These relatively low pressures do not cause much temperature rise in the fluid by heat of compression, and hence this heat of compression is dissipated through the walls of the reservoir quite quickly, usually in a matter of ten to twenty seconds or so. In some instances the temperature equalization may be in the reverse direction, i. e. the sample of air or gas taken in through tube 62 may be at a lower temperature than the meter. For aggravated situations with the heat interchange in either direction, an additional mass of metal with extended surface, such as fins, may be located within the reservoir 81. The thermometer 107 enables the operator to note when the temperature dissipation or equalization has occurred. A portion of this fluid is immediately conveyed to the fog chamber 21' through the normally open inlet valve 111, so that the fog chamber normally stands charged with a part of the same gas that is confined in the reservoir. The operator now places his eye at the eye piece 48 and then presses down on the plunger knob 122. The first part of the downward movement closes the contacts 127—128 and illuminates the light 41. The next part of the downward movement closes the inlet valve 111 to shut off the communication from the reservoir to the fog chamber. The final part of the downward movement opens the outlet valve 112 to vent the fog chamber to atmosphere, i. e. to blow the charge in the fog chamber down to atmospheric pressure. There is sufficient delay or timing interval between the closing of the inlet valve 111 and the opening of the outlet valve 112 to insure that the reservoir can never blow direct to atmosphere through the fog chamber. The sharp drop of pressure occurring in this blowing down operation in the fog chamber produces a brief adiabatic cooling of the charge in the chamber. In consequence thereof the vapor contained in the charge is precipitated or condensed into a momentary fog which is plainly visible in the eye piece 48. This follows from the reflection or refraction of the light rays by the fog particles, the fog being quite similar to that observed in a "Wilson Cloud Chamber." Immediately upon the disappearance of the fog in the chamber the plunger 121 is allowed to come back to normal for conveying another charge of gas into the fog chamber, whereupon the plunger is again depressed to repeat the blowing down operation. Each successive blowing down operation reduces the pressure difference between the pressure in the reservoir and atmospheric pressure. The pressure prevailing in the reservoir is carefully noted on the gauge 105 at the start of each blow down operation. Finally, the pressure difference becomes so small that the adiabatic cooling is insufficient to precipitate fog. The capacity of the reservoir and the initial pressure therein at the start of the cycle are preferably such that the final blowing down operation to produce fog is about the fifth or sixth operation or even further in the sequence. The reservoir or fog chamber pressure which was existent at the last blowing down operation effective to produce fog is then taken as the critical or control value from which the dew point is determined. The dew point can then be read directly from the pyrometer 101 or it can be determined mathematically from the following equation:

$$\frac{T1}{T2} = \left(\frac{P1}{P2}\right)^{\frac{K-1}{K}}$$

or $$T1 = T2\left(\frac{P1}{P2}\right)^{\frac{K-1}{K}}$$

where:

$T1 = 460° =$ the dew point temperature (Fahrenheit)

$T2 = 460° =$ the fog chamber temperature (Fahrenheit)

$P1 =$ the barometric pressure $P2 =$ the last fogging pressure $$K = \frac{Cp \text{ (specific heat at constant pressure)}}{Cv \text{ (specific heat at constant volume)}}$$

In the case of air, $Cp = 0.242$ and $Cv = 0.173$ (at 29.92 inches of mercury)

Therefore, $$K = \frac{0.242}{0.173} = 1.40$$

Hence, in the case of air, $$T1 = T2\left(\frac{P1}{P2}\right)^{\frac{1.40-1}{1.40}} = T2\left(\frac{P1}{P2}\right)^{.280}$$

The gauge 105 can be calibrated:
(1) to read directly in terms of pressure in the reservoir 81; or
(2) to read in terms of the pressure ratio $$\frac{P1}{P2}, \text{ or } \left(\frac{P1}{P2}\right)^{.280}$$

or (3) to read as $$\frac{K-1}{K} \log\left(\frac{P1}{P2}\right)$$

From the readings on the gauge 105 and/or on the pyrometer 101 at the last fogging pressure in the fog chamber, the dew point of the gas can be computed mathematically from the above equations, or can be derived from charts or tables based on the above, or can be computed directly from the above calibrations of the gauge 105. Furthermore, as I shall hereinafter describe in connection with Figure 6, a temperature scale reading log T can be made to match the gauge scale 105 so that the dew point can be read directly therefrom.

Referring now to the embodiment illustrated in Figure 5, this construction employs the fog chamber and much of the apparatus of Figure 4 except that this construction operates below barometric pressure, i. e. the fog chamber blows down or exhausts into a subatmospheric pressure in the reservoir 81. In such embodiment, the inlet port 61 of the pump 55 is connected with the interior of the reservoir 81, and the outlet port 66 is connected with atmosphere so that as the pump is operated the interior of the reservoir is exhausted to atmosphere. The rotary valve 111' connects the interior of the reservoir with the fog chamber 21' through conduit 113, and the rotary valve 112' connects the interior of the fog chamber with the duct 62 leading to inlet fitting 63. In this construction the timing of the valves 111' and 112' is reversed from that of the valves 111 and 112 of Figure 4; i. e. valve 111' normally stands closed but is opened when plunger 121 is depressed, and valve 112' normally stands open but is closed when the plunger is depressed, there being sufficient angular spacing between the valves to prevent any blow-through from the inlet fitting 63 to the reservoir 81 in the depression of the plunger 121, as described of the preceding embodiment.

In the operation of Figure 5, the pump 55 is operated to exhaust the reservoir 81 down to a substantial degree of evacuation, usually in the neighborhood of 20 inches of mercury absolute pressure, as indicated on the suction gauge 105' communicating with the reservoir. The inlet jet 63 is now placed in the region of the air to be measured, or is connected with the container of gas to be measured, and the plunger 121 is then pushed down. This first closes the valve 112' and then opens the valve 111'. In consequence, the fog chamber is first closed off from the inlet tube 62, and then the sample in the fog chamber is reduced in pressure and partially withdrawn from the fog chamber by being connected with the reservoir 81. Thereafter, the releasing of the plunger 121 closes the valve 111' and opens the valve 112' so that a new sample can enter the fog chamber. The above operation may be repeated several times for the purpose of scavenging old air or gas from the system before starting to take the determinative readings. In taking these final readings, successive samples are blown down in the condensing chamber 21' from atmospheric pressure to a lower pressure, or from any desired higher pressure to lower pressures. The fog will be clearly visible in the condensing chamber through the eye-piece 48 as long as the difference of pressure is sufficient to bring about the necessary adiabatic cooling to produce the fog. As the difference of pressure becomes less, consequent upon rise of pressure in the reservoir 81, the adiabatic cooling finally becomes too low to produce fog. The suction pressure reading which was indicated on the gauge 105' at the last blowing down operation which was operative to produce visible fog is then taken as the last fogging pressure P2 for substitution in the same mathematical equation used above, i. e.

$$\frac{T1}{T2} = \left(\frac{P1}{P2}\right)^{\frac{K-1}{K}}$$

Similarly, the temperature which prevailed in the fog chamber at the last fog producing operation, as indicated by the reading on the pyrometer dial 103, is taken as the fog chamber temperature T2 for substitution in the above equation. From this data and from the known barometric pressure P1, the dew point temperature T1 can be readily calculated. However, this dew point temperature T1 obtained from such calculation is the dew point temperature at the reduced pressure P2 which prevailed in the fog chamber or reservoir at the last fog producing operation, and it is then necessary to calculate or consult steam tables to correct for the dew point temperature at barometric pressure, or whatever higher pressure prevails at the source of the air or gas being sampled.

In Figure 6 I have diagrammatically illustrated how my improved apparatus can be used for determining the dew point of a gas stored under pressure in a container. The high pressure container 131 is illustrative of a typical container for storing oxygen, butane or any other gas under pressure. This pressure cylinder is provided with the usual pressure gauge 131a, pressure reducing valve 131b, manual control valve 131c, etc. This unit is connected through pipe 132 leading directly to the manually actuated valve apparatus 110, without going through the pump 55 and reservoir 81. For example, when the pressure drum 131 is to be connected with the embodiment of meter shown in Figure 4 the pipe 132 would be connected with pipe 113 leading to valve 111, as shown, and when the pressure drum is to be connected with the embodiment of meter shown in Figure 5 the pipe 132 would be connected with inlet duct 62 leading to valve 112', and the valve 111' would then be arranged to exhaust to atmosphere or other point of discharge. A pressure gauge 105'' would be connected with the interior of the condensing chamber 21' to indicate the pressure therein at each sampling operation. The successive sampling operations would be performed in the same manner described above in connection with Figures 4 and 5 except that the successive reductions in pressure would be obtained at the high pressure cylinder 131. For example, the successive pressure reductions might be obtained by successive adjustments of the manual valve 131c, or by successive adjustments of the automatic regulating valve 131b. The lowest pressure prevailing at the time of the last blow-down operation which is operative to produce fog is then taken as the basis for determining the dew point of the gas in the pressure cylinder 131.

Referring now to Figure 7, this shows a direct reading gauge which may be used with the fog chamber embodiments illustrated in Figures 4 and 6, particularly in lieu of the direct reading pyrometer 101. Said pyrometer is capable of giving a direct reading indication for all ordinary situations but the direct reading gauge of Figure 7, which I am now about to describe, possesses the advantages of a more rapid action and of holding each indication until the next blow-down operation is performed. This direct reading gauge, designated 133 in its entirety, may be substituted for the pressure gauge 105, or may be used to supplement that gauge, and may be connected either to the reservoir or to the fog chamber. It comprises a pressure responsive tube 134 having a bore 134a containing a suitable liquid, preferably mercury, this tube being curved in the form of a circle to extend around the periphery of a rotatable disc 135. Said disc has a temperature scale 136 around its edge, which is preferably a logarithmic or approximately logarithmic temperature scale. The compression of the air in the bore 134a of the tube 134 in advance of the mercury 140 would follow the thermodynamic law $PV = $ a constant, which could be expressed logarithmically to obtain a linear measure or linear scale. The disc 135 has rotatable bearing mounting at 137 on a bearing bracket or other suitable support 138. In the diagrammatic arrangement shown, the bracket 138 is secured to a tube 139 which serves as a communication duct between the reservoir 81 and the mercury tube 134, and also as a supporting standard for the gauge assembly. The upper end of the tube 139 opens into a mercury trap or mercury reservoir 134b formed at the upper end of the mercury tube 134. The upper extremity 139' extends a substantial distance up above the sloping floor 134c of the trap and is also spaced a substantial distance from the top wall 134d of the trap. By virtue of this arrangement, the entire dew point instrument can be tipped to different positions without permitting the mercury 140 to enter the tube 139 and thus flow down into the reservoir. Normally the mercury occupies a position in the tapering throat 134e leading from the trap to the main portion of the mercury tube. When starting a dew point measuring operation, it is desirable that the portion of the bore 134a in advance of the mercury 140 be at the prevailing barometric pressure, or at such lower pressure $P1$ as the samples are blown down to. This condition is obtained by tipping the entire instrument so that the mercury 140 will roll away from the throat 134e and allow barometric pressure or other base pressure to enter the bore 134a of the tube 134 in advance of the mercury. Upon righting the instrument the mercury returns to the throat 134e and thereafter responds to the pressure transmitted from the reservoir through tube 139 to the trap 134b. When equal pressures prevail at opposite ends of the body of mercury the lower end of the mercury column lies substantially at the "0" (zero) mark 143 inscribed on or fixed to the tube 134. The temperature indicated by the thermometer 107 on the front of the reservoir is now noted and the rotatable temperature dial 135 is then revolved to place this temperature reading of the dial in registration with the zero mark 143 on the mercury tube 134. As the pressure in the reservoir 81 is pumped up preparatory to the performance of successive blow-down operations, the mercury 140 is forced down through the bore 134a, against the barometric pressure prevailing therein, until the mercury reaches a maximum position or advanced position corresponding to the highest pressure then prevailing in the reservoir. As successive blow-down operations are performed the mercury retracts back toward the throat 134e. When the lowest pressure effective to produce fog is arrived at, the position of the lower end of the mercury column corresponding to that pressure is then read off against the corresponding temperature mark on the temperature scale 136. This reading is the dew point temperature for that sample of air or gas. It will be noted that the mercury remains in each indicating position until the next blow-down operation, so that there is ample time to make readings.

In Figure 8 I have fragmentarily illustrated a typical chart, which I may employ in conjunction with the instrument of Figure 4 or the instrument of Fig. 6 to facilitate the determination of the dew point without having to resort to mathematical computation, particularly in instruments which are not equipped with the direct reading gauge 101 of Figures 4 and 5, or the direct reading gauge 133 of Figure 7. This chart, designated 145, has its abscissa scale in terms of temperature (°F. or °C.) and its ordinate scale in terms of pressure, and over both of these is plotted a family of curves for adiabatic expansion. A typical example appears on the chart to show its manner of reading, viz.; assume a temperature of 40° F., a pressure reading of 36 inches of mercury (read from the gauge 105 or 105'') and a barometric pressure of 29.5 inches of mercury. The intersection of the temperature reading of 40 and the pressure reading of 36 is then followed down along the adjacent adiabatic curve to the intersection of this curve with the barometric pressure value of 29.5 which is then read vertically to the temperature reading of 12.5 on the abscissa scale. This reading of 12.5° F. is the dew point temperature for that sample of gas.

While I have illustrated and described what I regard to be the preferred embodiments of my invention, nevertheless it will be understood that such are merely exemplary and that numerous modifications and rearrangements may be made therein without departing from the essence of the invention.

In the appended claims I have used the term "gas" in its generic sense to include air and any other gaseous medium which it may be desired to test to determine its dew point or humidity.

I claim:

1. The herein described method which comprises establishing a fixed charge of the gas to be tested within a reservoir at a pressure higher than that of atmosphere to establish a selected pressure ratio therebetween, conducting a portion of said charge into a condensing chamber with consequent reduction of said pressure ratio, venting said condensing chamber to atmosphere through a sufficient pressure ratio and with sufficient rapidity to cause expansion and adiabatic cooling of said portion of the gas to condense vapors contained therein, sensing the presence of the condensed vapors, repeating the three latter operations until the pressure ratio lowers to the point where there is insufficient expansion and adiabatic cooling of the gas to condense the contained vapor as determined by the inability to sense condensed vapor in said portion of the gas, and computing the dew point of the gas from the lowest pressure ratio which was effective to cause condensation and from the temperature then prevailing in said condensing chamber.

2. In apparatus for measuring the dew point of a gas, the combination of a reservoir, a pump operative to pump a sample of the gas to be tested into said reservoir to a substantially predetermined pressure therein, a fog chamber, a first valve for admitting a charge of the gas from said reservoir into said fog chamber, a second valve for discharging said charge of gas from said fog chamber to atmosphere, means for actuating said valves in timed sequence whereby said first valve is closed to interrupt communication with said reservoir and thereafter said second valve is opened to blow-down the charge of gas in said fog chamber substantially to atmospheric pressure, such blowing-down operation being repeated until the pressure ratio between entering pressure and discharging pressure of the charge is so low that the resulting adiabatic cooling is not sufficient to condense the moisture of the gas into a fog in said fog chamber, means for projecting light rays into said fog chamber in timed sequence to the operation of said valves, an optical eyepiece for viewing the scattered light rays produced in said fog chamber upon the formation of fog therein, a pressure gauge for indicating the entering pressure of the charge of gas entering said fog chamber, and a temperature gauge for indicating the temperature in said fog chamber.

3. In an instrument for measuring the dew point of a gas, the combination of a condensing chamber adapted to receive a charge of the gas to be tested, means for blowing down said charge to a lower pressure in said chamber to condense some of the moisture from said gas into the form of a fog, means for detecting the presence of said fog, and a direct reading gauge for giving a direct reading indication of the dew point of said gas, said gauge comprising a tube containing a liquid responsive to the pressure in said chamber and a movable temperature scale of approximately logarithmic proportions, said liquid and said scale adapted to be correlated to each other to give a direct reading valuation of the dew point, said tube comprising a small bore scale portion and a liquid trap at one end thereof, whereby the liquid can be spilled from the small bore scale portion into said trap by tipping the instrument when it is desired to have atmospheric pressure enter the small bore scale portion ahead of the liquid column.

4. In apparatus for measuring the dewpoint of the atmosphere, the combination of a reservoir, means for creating a pressure differential between the interior of said reservoir and the atmosphere, a condensing chamber, means for alternatively connecting said condensing chamber with said reservoir and with the atmosphere whereby to effect pressure reductions on atmospheric samples in said condensing chamber and thereby cool said samples to cause fog to form, and means for detecting the formation of said fog.

5. In apparatus for measuring the dewpoint of the atmosphere, the combination of a reservoir, pump means for creating a pressure differential between the interior of said reservoir and the atmosphere, a fog chamber, cooperating valve devices for alternatively connecting said fog chamber with said reservoir and with the atmosphere whereby to effect pressure reductions on atmospheric samples in said fog chamber and thereby cool said samples to cause fog to form, means for projecting light rays into said fog chamber, and optical means for detecting the formation of said fog through the medium of said light rays.

6. In apparatus for measuring the dew point of the atmosphere or other gas, the combination of a reservoir for storing said gas at a superatmospheric pressure, a condensing chamber, means for introducing a sample of the gas from said reservoir into said chamber at a pressure greater than atmospheric, means for quickly venting said chamber to atmosphere for effecting a pressure reduction in said sample through a sufficient pressure range to cause fog to form in said chamber, and means for detecting the formation of said fog.

7. In apparatus for measuring the dew point of a gas, the combination of a condensation chamber, a manually actuated pump for introducing a sample of the gas to be tested into said condensation chamber, said gas being initially confined in said condensation chamber at a predetermined pressure, a pressure gauge for indicating such pressure, manually actuated quick opening exhaust valve means for thereafter effecting an extremely rapid venting of said chamber to a region of lower pressure to effect a substantially adiabatic expansion of the charge in said chamber, means for sensing the formation of fog in said chamber, and gauge means for indicating the temperature of said charge, said manually actuated exhaust valve means being manually actuatable at any desired time interval after the introduction of the charge into said chamber, whereby to afford sufficient time interval to dissipate any heat of compression from said charge before the charge is expanded.

8. In apparatus for measuring the dew point of the gas, the combination of a condensation chamber, manually actuated charge introducing means for introducing a charge of the gas to be tested into said chamber and for confining it initially therein at a predetermined pressure, a pressure gauge for indicating said pressure, manually actuated quick opening exhaust valve means for effecting an extremely rapid venting of said chamber to a region of lower pressure to effect a substantially adiabatic expansion of the charge in said chamber, means for sensing the formation of fog in said chamber including a source of artificial light arranged to project a light beam into said fog, and gauge means for indicating the temperature of said charge, said charge introducing means being manually actuatable at any desired time interval after the expansion of a preceding charge in said chamber whereby to afford sufficient time interval to take care of lag of response of said gauge means in giving its temperature indication.

9. In apparatus for measuring the dew point of a gas, the combination of a condensation chamber, charge introducing means comprising a manually operated pump for introducing a charge of the gas to be tested into said chamber and for confining it therein at a predetermined initial pressure, said charge introducing means being operable to create different predetermined initial pressures in the confined charge, a pressure gauge operatively connected to indicate said predetermined initial pressures, manually actuated quick opening exhaust valve means for effecting an extremely rapid exhausting of said chamber to a pressure region having a fixed lower pressure, means for sensing the formation of fog in said chamber including a source of artificial light arranged to project a light beam into said fog, and a gauge communicating with said chamber responsive to the pressure ratios between said different predetermined initial pressures and said fixed lower pressure.

10. The herein described method which comprises introducing a charge of the gas containing a condensable vapor into a condensation chamber of substantially fixed volume at a superatmospheric pressure, reading the approximate pressure of said charge from pressure indicating means responsive to said superatmospheric pressures, reducing the pressure of said gas within said condensation chamber from a substantially predetermined superatmospheric pressure to atmospheric pressure at a sufficiently rapid rate and through a sufficient pressure reduction to bring the gas to a temperature equivalent to the saturation of its condensable vapor, and then sensing the presence of the condensed vapor by projecting a beam of light rays from a source of artificial light into the gas to sense the condensed vapor by the scattering of said light rays.

11. The herein described method which comprises introducing a sample of a gas containing a condensable vapor into a condensation chamber, measuring the pressure of the gas in said chamber, reducing the pressure of said gas within said condensation chamber from a predetermined superatmospheric pressure to atmospheric pressure at a sufficiently rapid rate and through a sufficient range of pressure reduction to bring the gas to a temperature equivalent to the saturation of its condensable vapor, and projecting a beam of light rays into the gas and sensing the presence of the condensed vapor by the scattering of said light rays.

12. In apparatus for measuring the dew point of a condensable vapor in a gas, the combination of a condensation chamber of substantially fixed volume, a pump for introducing a sample charge of the gas into said chamber at a predetermined superatmospheric pressure, a pressure gauge connected with said chamber for indicating said superatmospheric pressure, a valve for venting said chamber to atmosphere to effect a sharp pressure reduction in said sample, the range and rapidity of pressure reduction being sufficient to bring the gas to a temperature equivalent to the saturation of its condensable vapor, means for projecting a beam of light rays into said chamber against the condensed vapor particles, and optical means for viewing the light rays as influenced by said condensed vapor particles.

13. The herein described method which comprises introducing a sample of a gas containing a condensable vapor into a condensation chamber at a predetermined superatmospheric pressure, measuring such superatmospheric pressure by a pressure gauge responsive thereto, reducing the pressure of said gas within said condensation chamber from said predetermined superatmospheric pressure to atmospheric pressure at a sufficiently rapid rate and through a sufficient range of pressure reduction so as to effect the necessary adiabatic cooling for producing fog, projecting a concentrated beam of light rays from a source of artificial light into said chamber and sensing the presence of the fog in said chamber by the scattering effect of said light rays, taking readings of the temperature of the gas and of the ratio of the superatmospheric and atmospheric pressures, and applying these values to a prepared chart which gives the dew point of the gas from these applied values.

14. The herein-described method which comprises establishing a charge of the gas to be tested within a reservoir at a pressure higher than that of an adjacent region of predetermined lower pressure to establish a pressure ratio therebetween greater than unity, conducting a portion of said charge into a condensing chamber with consequent reduction of said pressure ratio, venting said condensing chamber to said predetermined region of lower pressure through a sufficient pressure ratio and with sufficient rapidity to cause expansion and adiabatic cooling of said portion of the gas to condense vapor contained therein, sensing the presence of the condensed vapors, repeating said latter operations until said pressure ratio is lowered to the point where there is insufficient expansion and adiabatic cooling of the gas to condense the contained vapor as determined by the inability to sense condensed vapor in said portion of the gas, and computing the dew point of the gas from the lowest pressure ratio which was effective to cause condensation and from the temperature then prevailing in said condensing chamber.

15. In apparatus of the class described, the combination of a condensing chamber adapted to receive the gas to be tested, means including a pump for introducing successive charges of said gas into said chamber at progressively lower superatmospheric pressures, a pressure gauge for indicating these progressively lower superatmospheric pressures, a thermometer for indicating the temperature of the charges in said chamber, valve means for reducing the pressure of each of said charges in said condensing chamber to atmospheric pressure in a relatively sudden pressure reduction, whereby to cause adiabatic cooling of each successive charge in said chamber, such adiabatic cooling as results from a relatively high ratio between entering superatmospheric pressure and atmospheric pressure serving to cause the moisture in said gas to condense into a freely suspended fog, and means for sensing the presence of said fog including a source of artificial light arranged to project a light beam into said fog.

16. In apparatus for measuring the dew point of a gas, the combination of a condensing chamber, means including a manually actuated pump for introducing successive charges of the gas to be tested into said condensing chamber at progressively lower entering superatmospheric pressures, temperature responsive means for indicating the approximate temperature of the charges in said chamber, means for blowing-down each of said charges to atmospheric pressure in a relatively quick pressure reduction to cause adiabatic cooling of the charge, such adiabatic cooling as results from a relatively high ratio between entering pressure and reduced pressure together with quick pressure reduction serving to condense some of the moisture content of the gas into a fog, means for sensing the presence of a fog in said chamber including a source of artificial light arranged to project a light beam into said fog, and pressure responsive means for indicating which is the lowest entering pressure in said condensing chamber that is operative to produce a fog.

17. In apparatus for measuring the dew point of a gas, the combination of a storage source of the gas under pressure, a condensing chamber, first valve means for controlling the introduction of successive charges of the gas from said storage source under pressure into said condensing chamber, a pressure gauge for indicating the pressures of said successive charges, a thermometer for indicating the temperatures of said successive charges, second valve means for controlling the discharge of said charges of gas from said chamber to a region of lower pressure, said valve means being operated in predetermined sequence whereby to create a differential between the entering pressure and the discharging pressure for effecting a quick reduction of pressure of each charge of the gas to cause adiabatic cooling thereof in said chamber, and means for determining the presence of any fog in said chamber resulting from such adiabatic cooling including a source of artificial light arranged to project a light beam into the charge of gas.

18. In apparatus of the class described, the combination of a condensing chamber adapted to receive the gas to be tested, means including a pump for introducing successive charges of said gas into said chamber at progressively lower superatmospheric pressures, valve means for venting said condensing chamber to atmosphere to condense some of the moisture contained in said charges of gas, means for sensing such condensation including a source of artificial light projecting a light beam into said gas, and a direct reading manually settable gauge responsive to the pressure in said condensing chamber and including a manually movable scale device adapted to be manually set to condensing chamber temperature for giving a direct reading indication of the dew point of said gas pursuant to the sensing of such condensation.

19. In apparatus for measuring the dew point of a gas, the combination of a condensing chamber, means including a pump for introducing successive charges of said gas into said chamber at progressively lower superatmospheric pressures, means for rapidly reducing the pressure of each charge of gas in said condensing chamber down to atmospheric pressure and through a sufficient pressure reduction to cause some of the moisture in the charge of gas to condense into a fog by adiabatic cooling, means for sensing the presence of said fog including a source of artificial light arranged to project a light beam into the gas, and a thermocouple temperature gauge arranged to give a direct reading indication of the dew point of the gas being measured in said chamber.

20. The method of determining the dew point of a gas which comprises introducing a charge of the gas into a condensation chamber at a sufficiently high superatmospheric pressure that the pressure ratio between such superatmospheric pressure and atmospheric pressure will be capable of producing fog in said charge of gas from adiabatic cooling consequent upon a sudden blowing-down of said charge to atmospheric pressure, reading the approximate pressure ratio from gauge means which is responsive to such superatmospheric pressure, reading the approximate temperature of the charge from a thermometer thermally responsive to said charge, quickly venting the chamber to atmosphere to blow-down the charge to atmospheric pressure and thereby cause the moisture in the charge to condense to fog, projecting a beam of light rays from a source of artificial light into said charge to obtain a visual sensing of the fog from the scattering of the light rays by the fog, repeating these operations with successive charges of the gas confined in said condensation chamber at different sub-atmospheric pressures for establishing different pressure ratios, and computing the dew point of the gas from the lowest pressure ratio which was effective to cause fog and from the temperature then prevailing in said condensation chamber.

21. The method of determining the dew point of a gas which comprises introducing a charge of the gas into a fixed volume condensation chamber at a superatmospheric pressure bearing a predetermined pressure ratio to atmospheric pressure, reading the approximate temperature of the charge of gas from a thermometer thermally responsive to said charge, reading the approximate pressure ratio of the charge of gas from gauge means which is responsive to such superatmospheric pressure, quickly venting the chamber to atmospheric pressure to produce a sufficient pressure reduction to cause the moisture in said charge to condense to fog, projecting a beam of light rays from a source of artificial light into said charge to obtain a visual sensing of the fog from the scattering of the light rays by the fog, repeating these operations at progressively lower superatmospheric pressures, and computing the dew point of the gas from the lowest pressure ratio which was effective to cause condensation and from the temperature then prevailing in said condensation chamber.

JOHN R. BOYLE.

REFERENCES CITED

The following references are of record in the file of this patent:

UNITED STATES PATENTS

| Number | Name | Date |
| --- | --- | --- |
| 1,686,103 | Plant | Oct. 2, 1928 |
| 1,883,116 | Tomlinson | Oct. 18, 1932 |
| 1,945,660 | Scott | Feb. 6, 1934 |
| 2,108,173 | Martin et al. | Feb. 15, 1938 |
| 2,268,785 | Thornthwaite | Jan. 6, 1942 |
| 2,281,418 | Deaton et al. | Apr. 28, 1942 |
| 2,316,624 | Romanelli | Apr. 13, 1943 |

OTHER REFERENCES

Milvay Cloud Apparatus, Catalogue No. 48 of Chicago Apparatus Co., received in the Pat. Off. May 12, 1936 Item 7590, p. 84, copy in the Scientific Lib. of U. S. Patent Office (Q 185 C532, C.1).

Thiessen "Weather Glossary" (published by Weather Bureau, Commerce Dept.) p. 101 (Scientific Lib.-QC 854.T5).

Pages 157 and 158 of Thermodynamics by J. E. Emswiler published by McGraw-Hill Book Co. Inc., 370 Seventh Avenue, New York in 1927. A copy of this publication may be found in Div. 36, U. S. Patent Office.